United States Patent
Shimizu et al.

[11] Patent Number: 6,156,134
[45] Date of Patent: Dec. 5, 2000

[54] BONDING METHOD OF DUAL PHASE STAINLESS STEEL

[75] Inventors: Takao Shimizu, Nagoya; Hirotsugu Horio, Toukai; Noboru Yamamoto, Nagoya; Shigeyuki Inagaki, Nagoya; Hiroaki Suzuki, Nagoya; Masaki Tsuchiya, Yokkaichi, all of Japan

[73] Assignee: Daido Tokushuko Kabushiki Kaisha, Nagoya, Japan

[21] Appl. No.: 09/140,887

[22] Filed: Aug. 27, 1998

[30] Foreign Application Priority Data

Aug. 29, 1997 [JP] Japan .................................. 9-249558
May 11, 1998 [JP] Japan ................................. 10-127176

[51] Int. Cl.$^7$ ............................................ B23K 35/30
[52] U.S. Cl. ......................... 148/526; 148/530; 219/615; 228/233.2; 228/262.42
[58] Field of Search .................... 148/526, 528, 148/529, 530; 228/231, 233.2, 246, 262.42; 219/615

[56] References Cited

U.S. PATENT DOCUMENTS

| | | | |
|---|---|---|---|
| 4,314,661 | 2/1982 | DeCristofaro et al. | 228/262.42 |
| 5,759,300 | 6/1998 | Hasegawa et al. | 228/262.42 |
| 5,902,421 | 5/1999 | Christy | 148/528 |
| 5,964,398 | 10/1999 | Kohno et al. | 148/530 |
| 6,024,276 | 2/2000 | Hirata et al. | 228/231 |

FOREIGN PATENT DOCUMENTS

| | | |
|---|---|---|
| 0 418 606 B1 | 3/1991 | European Pat. Off. . |
| 6-7967 | 1/1994 | Japan . |
| 6-142948 | 5/1994 | Japan . |
| 9-262685 | 10/1997 | Japan . |
| WO97/36711 | 9/1997 | WIPO . |

Primary Examiner—George Wyszomierski
Attorney, Agent, or Firm—Bacon & Thomas

[57] ABSTRACT

In a method of bonding ferric and austenitic dual stainless steels, an insert material made of a Ni base alloy having a melting point below 1290° C. is put between the bonding cross section faces of mother material steels comprising a dual phase stainless steel. A pressure force in the range of 3 MPa to 5 MPa is applied to a bonding area. The bonding area is heated at a temperature in the range of 1290° C. to a melting point of the mother material steel. The temperature is kept for in the range of 30 second to 180 second.

12 Claims, 3 Drawing Sheets

BONDING METHOD OF DUAL PHASE STAINLESS STEEL

BACKGROUND OF THE INVENTION

1. Field of the Invention

The present invention relates to a dual phase stainless steel, and specifically relates to bonding dual phase stainless steel tubes for oil production, for corrosion resistance of chemical plant, for conveyer of crude oil, for heat exchanger of sea water conversion and relates to bonding dual phase stainless steel tube against a dual phase stainless steel flange for the above noted applications.

2. Description of the Related Art

A ferritic/austenitic dual phase stainless steel (dual phase stainless hereunder) is made of increasing content of Cr, of decreasing Ni and of adding Mo etc., and by being solution treated to make dual phase characteristics of austenitic and of ferritic. The dual phase stainless has good strength and toughness, and has good quality of stress corrosion cracking proof of inter-granular corrosion proof in comparison with the conventional austenitic stainless steel. Accordingly, it has wide application for oil environment and heat exchanger of sea water conversion.

Oil reservoir of oil well stays thousands meters underneath the ground. Dual phase stainless steel tube for tubing is used by way of connecting each piece of 10 to 15 meter length and putting them to down hole. As a method of connection, there exist way of mechanical coupling, orbital welding and supposedly liquid phase bonding.

Figure 4:
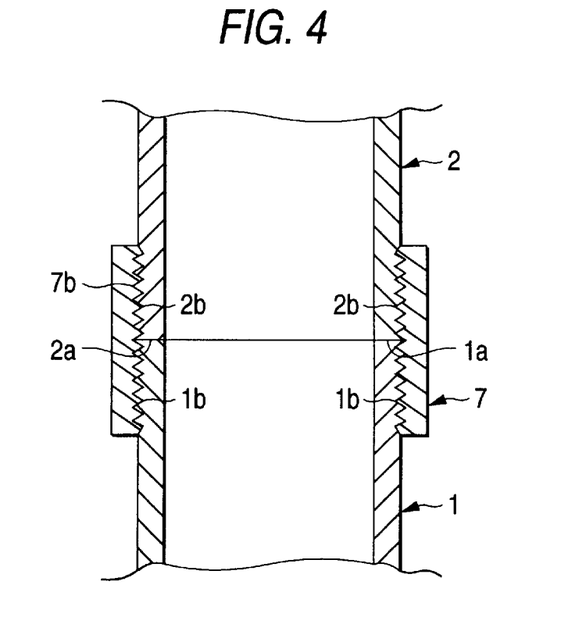
FIG. 4 is a schematic view showing a conventional mechanical coupling method.

The mechanical coupling method, as is shown in FIG. 4, makes screw connection by putting together fixed side of tubes (tube 1) which has been connected as a string of tube underground and the other side of upper movable piece (tube 2) by using external screw connector 7 which combines outer threads of down side tube 1, by its internal threads, and outer threads of upper side tube. The bonding face of the down side tube 1a and of upper side tube 2a contact together so that tube 1 and tube 2 is connected.

Mechanical coupling requires five to ten minutes to make one couple and has a good productivity at connecting but it has the disadvantage of allowing oil and gas leakage at the connection. Therefore special care for precision machining on to external threads of tube 1 and tube 2, and to connector 7 have been requested together with demand of high level skill of connection. The connected part has good tensile strength but may have problems in compression stress which may spreads out in a radiant direction from connector 7 and may accelerate leakage of oil and gas. As is obvious, connector 7 has a larger outer diameter than that of tubes 1 and 2 therefore, larger hole than outer diameter of tube 1 and 2 is basically demanded.

Figure 5:
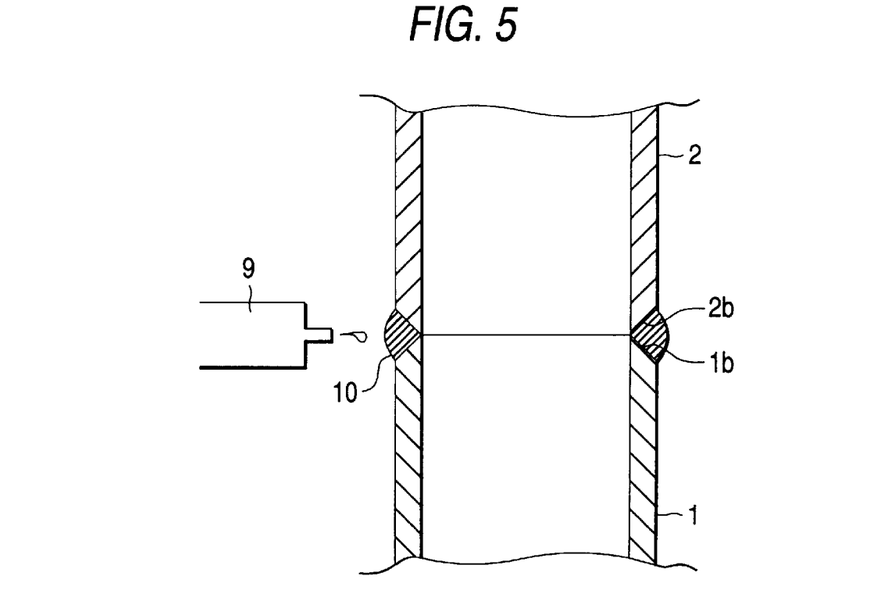
FIG. 5 is a schematic view showing a conventional orbital welding method.

In the welding method, as shown in FIG. 5, at the top of tube 1 and bottom of tube 2, welding edges 1b and 2b are prepared and are placed together, and a welding torch 9 moves around the tube surface in circle to mount a melted metal 10 on edges 1b and 2b. This is a way of welding the tube 1 and tube 2.

Welding is advantageous because it does not cause leakage of oil and gas at the welded joint and has good compression resistance well as good tensile strength, plus, because a connector is not used, the same hole diameter as of the tube could be possible. However, in the welding method, the amount of welding can not be so large. Accordingly, particularly, in the case of welding thick tubes, problems which are encountered include consuming time as long as one to two hours to perform the welding, and talented skill is also prerequisite.

On the other hand, liquid phase diffusion bonding is a method as follows; Putting an insert material between two steel tube cross sections, applying pressuring power longitudinally, heating up and holding the temperature higher than the melting point of the insert material and lower than that of the tube for some time period to have some part of chemical composition spread in atomic particle to the both sides tubes and melting point of the residual of insert material, after moving atoms be evacuated, comes down which means the residual of insert will solidify itself by shifting melting point higher, in partly evacuated chemistry of insert, than used to be.

Liquid phase diffusion bonding has similarity in those characteristics which have no concern of oil and gas leak, compression resistance and keeping the same bonded joint diameter as of external tube diameter, plus higher productivity than welding in processing one batch in about 30 minutes as well as high quality and efficiency. Therefore liquid phase diffusion bonding is the most recommendable bonding method for joining oil tubular.

Liquid phase diffusion bonding has been well known technology. An example is Unexamined Japanese Patent Publication (kokai) No. Hei. 6-007967, in which a way of bonding high alloy tube for oil industry is described, putting insert material between two pieces of high alloy tubes, applying pressure of 4.9 MPa through 19.6 MPa (0.5 kgf/mm$^2$ to 2.0 kg/mm$^2$) and heating up to 1200 through 1280° C. and keeping the temperature longer than 120 seconds, when melting point of insert material is equal to or below 1150° C.

Further, WO97/36711 discloses a method for bonding a stainless steel in the following manner. In this method, a martensitic stainless steel or a dual phase stainless steel including not less than 9 wt % of Cr is used. A low melting point bonding material composed of a Ni-based alloy foil including not less than 50 wt % of Cr, having the melting point of not more than 1150° C. and having the thickness of 10 to 80 μm is put between the bonding cross section faces of the stainless steels to be bonded. The pressure of 0.5 to 2 kgf/mm$^2$ is applied while a temperature is kept between the melting point of the bonding material and that of the stainless steel for more than 120 second so that the heating length which becomes more than 800° C. is 3 to 20 mm.

Unnecessary excessive heating causes troubles in mother material strength and in corrosion resistance. Therefore, high frequency induction heating has been popular for its partial and concentrated heat efficiency. In high frequency induction heating, because of surface effect, alternate electricity accumulates on tube surface and conducts to the inside of tube.

As described in Unexamined Japanese Patent Publication (kokai) No. Hei. 6-7967, bonding at relatively low temperature as low as below 1280° C. and in short time heat keeping by high frequency induction will make unbonded boundary partially because of inefficient heat elevation and spread at cross section boundary.

On the other hand, by making heating time longer, such an inefficient bonding could be improved, but too long time heating mother material will deteriorate it and increase the deformation at boundary, which would be a good reason of concentration of stress and in case of internal deformation, be an obstacle for smooth liquid flow.

Furthermore in offshore oil field tubular, unexpected impact force may hit the tube. There has been no intention regarding how to improve impact resistant value at bonded area.

Moreover, referring to the method disclosed in WO97/36711, the present inventors conducted the bonding test of the dual phase stainless steel (diameter: 200 mm, thickness: 20 mm) having a practical size. The following conditions were selected so as to corresponding to those of WO97/36711.

As the material to be bonded, used was a dual phase stainless steel (JIS G3459; SUS329J1, melting point: 1420° C.) including 23.0 to 28.0 wt % of Cr. As the low melting point bonding material, used was a nickel brazing material (JIS Z3265; BNi-5, melting point: 1080 to 1135° C.) including 18.0 to 19.5 wt % of Cr and having the thickness of 40 μm. The bonding temperature was 1300° C., time for keeping the bonding temperature was 300 second, and the applied force was 1.25 kgf/mm$^2$. Thus, the bonding test was conducted.

However, the bonded body which was obtained under the above-described conditions was extremely deformed at the bonding area, and the deformation amount of the bonding area exceeded 20 mm. Further, many cracks were observed at the surface of the bonding area.

Next, the test was conducted again in the same condition as described above except that the bonding temperature was changed to 1200° C. which is less than the melting point of the nickel brazing material. In this case, the deformation amount of the bonding area of the bonding body thus obtained is a little, and no crack was observed in the surface of the bonding area, thereby capable of obtaining a good coupling in view of the external appearance.

From thus obtained dual phase stainless steel bonding coupling, four test pieces for the tensile test (length: 300 mm, width: 25.4 mm) was cut, and the tensile test was conducted. As the result of the test, all of the four test pieces were broken at the bonded boundary, and the tensile strength of them exhibited extremely low value as 200 to 400 MPa. Accordingly, in case of applying the conditions of WO97/36711 to the dual phase stainless steel having a practical size, it was not possible to obtain a good bonding coupling for practical use.

SUMMARY OF THE INVENTION

It is an object of the present invention to provide a bonding method of a dual phase stainless steel, in case of thick wall steel tube, capable of eliminating unbonded or insufficiently bonded part, making high quality and tough bonding, controlling excessive deformation into minimum level and improving impact resistivity value.

It is another object of the present invention to provide a bonding method of a dual phase stainless steel, in which even if the method is applied to the bonding of the dual phase stainless steel having a practical size, the bonding area is not excessively changed and the no crack is generated on the surface of the bonding area as well as the bonding area has a tensile strength equal to or more than a mother material.

According to the present invention, a method of bonding ferritic and austenitic dual stainless steels, comprises the steps of: putting an insert material comprising a Ni base alloy having a melting point below 1290° C. between the bonding cross section faces of two mother materials made of dual phase stainless steel; applying pressure force in the range of 3 MPa to 5 MPa to a bonding area; and heating the bonding area at a temperature in the range of 1290° C. to a melting point of the dual phase ferritic and austenitic stainless steel in which the temperature is kept in said range for a time of 30 seconds to 180 seconds.

DETAILED DESCRIPTION OF THE INVENTION

Detailed description of the present invention will be described as follows.

A bonding method of the present invention is putting insert material made of a nickel alloy the melting point of which is less than 1200° C. between bonding cross section faces of two mother materials made of dual phase stainless steel, applying pressuring force to the bonding cross section faces of the mother materials in the range of 3 MPa to 5 MPa, heating the bonding cross section faces in the range of 1290° C. to melting point of the mother material, and keeping the temperature in this range for a period of 30 seconds to 180 seconds.

The dual phase stainless steel used in the present invention is SUS 329 J1, SUS 329 J3L, SUS 329 J4L or the like, but not limited thereto. The shape of the material application has many varieties including tube, flange, plate, block etc.

Bonding temperature should be controlled between 1290° C. and the melting point of the mother material. If bonding temperature is less than 1200° C., bonding boundaries do not reach to bonding temperature, the insert material does not heat up to melting point and diffusion of chemical elements of the insert material does not happen successfully and eventually it goes to fail to obtain sufficient bonding toughness. If the mother material is heated more than the melting point thereof, the mother material melts itself and fails to keep its own shape. For reference, the melting point of the mother material as described above is between 1400° C. and 1450° C.

Holding time of keeping the bonding temperature is between 30 and 180 seconds. In case of less than 30 seconds, diffusion of chemical elements of insert material does not happen successfully and in brazing phenomena, and partially or un-bonded boundary may especially where is remote from heating device.

In case of longer than 180 seconds, the mother material fails to keep its own shape or deteriorate its own strength and lose corrosion resistivity.

The application of the pressuring force should be controlled between 3 MPa and 5 MPa. If the pressuring force is less than 3 MPa, the contact of boundaries of the two mother materials will be insufficient and will fail to obtain aimed bonding strength. If the pressuring force is more than 5 MPa, mother material will deform itself and fail in successful bonding.

The insert material for bonding dual phase stainless steel must be a Ni base alloy. Because of using this material for the inert material, toughness and corrosion resistivity of bonded boundary could be kept as the same level as those of mother materials. The insert material should have melting points less than 1290° C. If melting point of insert material be higher than 1290° C., bonding temperature will be high enough for the mother material to deform itself.

The insert material of Ni base alloy, by several ways of setting up including thermal spray, dipping, plating, spattering etc., will work as single coating layer of Ni base alloy, or multi-coating layers at bonding boundary, the Ni base alloy chemical compositions of which will compose a certain melting point after reorganized by the first stage melting. Various shapes of the insert material may work when inserted between the materials, but foil shape, fish scale shape or powder shape will be recommendable for its cost economy and easiness of handling.

The thickness of the insert material, in case of foil shape, fish scale shape or powder shape, is in the range of 20 $\mu$m to 100 $\mu$m when being set up at bonding boundary. Those insert materials, in case of foil, which are thinner than 20 $\mu$m are not easy for manufacturing and for handling at workshop and, in case of fish scale or powder, it is not easy to make uniform spread over bonding cross section. If insert material is thickener than 100 $\mu$m, it takes long time to make diffusion sufficiently which also make a good reason to deform the mother materials and deteriorate the bonding quality.

Ni alloy as the insert material includes 3 wt %$\leq$Si$\leq$6 wt %, 5 wt %$\leq$Cr$\leq$10 wt %, 2 wt %$\leq$Fe$\leq$5 wt %, 2 wt %$\leq$B$\leq$4 wt %, with residual of Ni. Thus composed Ni based alloy used as the insert material improves ferritic phase in dual phase stainless steel and also accelerate transferring of atomic particles at bonding boundary, which contributes to produce much improved impact value.

Roughness of bonding cross section surface should be Rmax$\leq$50 $\mu$m. If the Rmax is above 50 $\mu$m, some part of bonding boundary is un-bonded due to incomplete filling out of the insert material.

Inert gas will make an ideal environment atmosphere, while bonding dual phase stainless steel bonding could be carried out in the air or in vacuum. Bonding in air oxidizes the heated portion and deteriorate bonding toughness. Bonding in vacuum condition, especially in case of long length of material like oil tubular, can not be carried out in practical. Inert gas atmosphere can be generated by building a chamber in which a whole bonding material and heating device could be covered, or by spraying inert gas to the heating material for shielding the bonding part against the air.

There are several methods for heating the bonding cross section faces such as using a heater to radiate heat over the bonding boundary, charging electricity to the heating materials to generate resistance heating by contact resistance with the inserted material precisely at the bonding area etc. depending upon shape, largeness and other demanded conditions.

As for longitudinal material heating including steel tube, high frequency induction heating to be used in induction heat coil is highly preferable. High frequency induction heating device provides bonding with partial and precise spot heating to the bonding area. The frequency should be kept below 100 kHz. The more frequent at high frequency induction heating, the note obvious the surface effect would be, therefore, more than 100 kHz heats only the surface and uniform and wide spread heating could not be available.

The bonding method of dual phase stainless steel described in the above uses Ni base alloy insert material which has good toughness and corrosion resistivity, makes better liquid diffusion bonding in heat efficiency, low voltage electricity and time saving then all cross section area at boundary is heated up to bonding temperature in short time and atomic particle transfers note efficiently in addition to the effect of controlling deformation of mother materials.

The insert material is made of specific chemical compositions of Ni base which works for improving ferritic phase in dual phase stainless steel and also accelerate transferring of atomic particles at bonding boundary, which contributes to produce much improved impact value.

Moreover, since the bonding condition is optimized as described above, even if the bonding method of the present invention is applied to the dual phase stainless steel having a practical size, the bonding area is not changed excessively and no crack is generated on the surface of the bonding area as well as it is possible to obtain the bonding coupling having the tensile strength equal to or more than the mother material.

Embodiments

Figure 1:
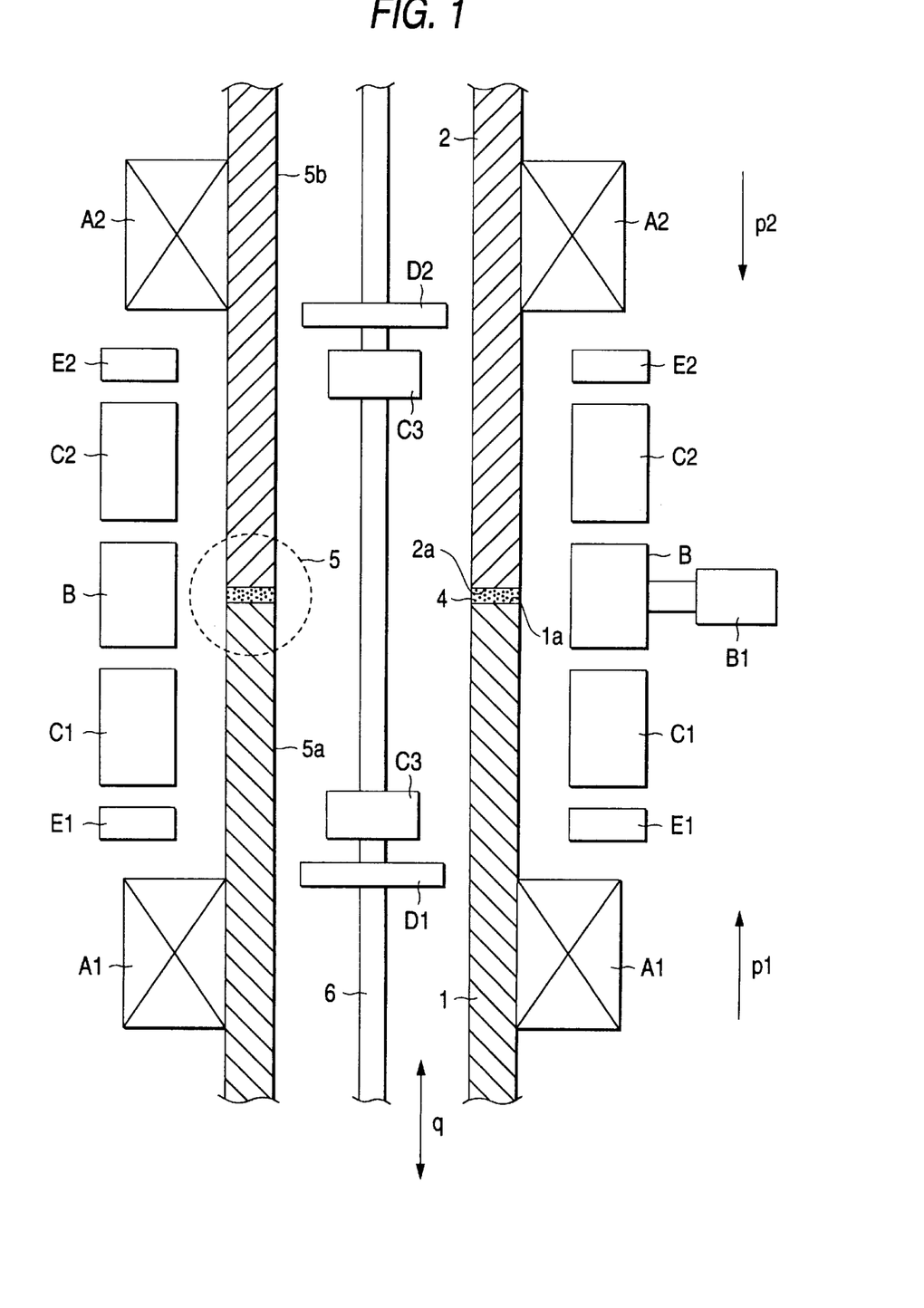
FIG. 1 is a schematic view of a bonding device for carrying out the bonding method of a dual phase stainless steel according to the present invention.

The preferred embodiments according to the present invention will be described as follows referring to the accompanying drawings. FIG. 1 shows a schematic view of a bonding device for carrying put the bonding method of a dual phase stainless steel according to the present invention. This is a bonding unit to bond steel tubes which consists of a pair of clamping mechanics A1 and A2, a heating device B, external gas discharging device C1 and C2, internal gas discharging devices C3 and C4, water cooling nozzles D1 and D2 and thermo-sensors E1 and E2.

There exists clamping device A1 and A2 symmetrically in vertical direction, with function of clamping two tubes, 1 and 2, which holds a insert material 4 between a pair of boundary cross sections 1a and 2a, the whole bonding boundary 5 has a certain distance from each clamping device. The clamp A1, located downwards towards a bonding boundary 5, holds a down side tube 1 gripping the external surface and lift the tube 1 up (p1 arrow direction in FIG. 1). The clamp A2, located upwards towards the bonding boundary 5, holds down a tube 2 gripping the external surface and move the tube 2 down (p2 arrow direction).

The heating device B is composed of high frequency induction heating coil made of copper pipes, which is arranged to surround the round surface 5a of the bonding boundary 5. A coil, by way of control panel (not shown here), is connected with high frequency electricity generator (not shown here), and certain power of electricity and certain frequency of wave is charged to the coil. Inside of coil, water circulates for cooling Joule heat down to keep coil from melt away.

The heating device B was furnished with a radiation thermometer B1 for measuring the temperature of the bonding boundary 5. The output terminal of the radiation thermometer B1 is connected to control panel (not shown here) and the temperature measured by the radiation thermometer B1 is transmitted to the panel through output terminal.

The external gas discharger C1 and C2 are installed above and underneath of heating device B, respectively, and around the external surface 5a of the tubes 1 and 2. The function of the external gas discharger C1 and C2 is to discharge inert gas Ar, $N_2$ or the like, focusing to bonding the boundary 5, to the direction of external round surface of the round surface 5a, at the stage of diffusion bonding and to keep external surface 5a heating zone shielded.

Furthermore, between the clamp device A1 and the external gas discharger C1 and between the clamp device A2 and the external gas discharger C2, the thermal sensor E1 and E2 are installed facing to the external surface 5a of the tubes 1 and 2. The sensors E1 and E2 measure the temperature of the tubes 1 and 2 at diffusion bonding and define the area to be enforcedly cooled after the bonding.

Inside of the tubes 1 and 2, from top side of the tube 2, a dual composed tube 6 is inserted. The tube 6 is provided with a pair of internal gas dischargers C3, C3 with keeping a certain distance. The water cooling nozzle D1 is arranged under the bottom side internal gas discharger C3, and the water cooling nozzle D2 is arranged above the top side internal gas discharger C3.

The function of a pair of the internal gas chargers C3, C3 is to discharge inert gas such as Ar, $N_2$, by focusing to the bonding boundary 5, to the direction of internal round surface 5b, at the stage of diffusion bonding then to keep the external surface 5a side of the heating zone shielded. The water cooling nozzles D1 and D2, after diffusion bonding carried out, spray cooling water or Ar gas to cool heated zone spreading over both upwards and downward sides of the bonded boundary to thereby enforcedly cooling the heating zone from the internal surface 5b side.

The dual composed tube 6 is provided with an inert gas piping (not shown here) and a coolant piping (not shown here). The inert gas piping is connected to the external gas dischargers C3 and C3 and the coolant piping is connected to the cooling nozzles D1 and D2. By switching a valve (not shown) built in the composed tube 6, the inert gas or the coolant is discharged to the internal surface 5b of the tube. The dual composed tube 6 also moves up and down so as to change the discharge position of the inert gas or the coolant.

Incidentally, the arranged positions of the cooling nozzles D1 and D2 is not limited as shown in FIG. 1. They may be provided to surround the external surface 5a of the tube. Alternatively, they may be provided in both inside and outside of the tube.

Next, a method for bonding the dual phase stainless steel by using the above described boding device is described as follows.

Firstly, the tubes 1 and 2 are clamped by the clamp devices A1 and A2, respectively. Next, a thin foil insert material 4 composed of Ni base alloy is put on the cross section surface 1a of the tube 1. Thereafter, the clamps 1 and 2 are operated to move the tube 1 and 2 alongside the arrow direction p1 and p2, respectively, and the tubes are compressedly contacted to form the bonding boundary 5. Then, as it stands, the pressure in the axial direction is continuously applied to the tubes.

As for selection of insert material 4, in case of using fish scale shape or powder shape, it may be directly sprayed to the cross section surface 1a of tube 1 or a paste by mixing with solvent or binder may be applied thereto. In case of preliminary setting up the insert material, by way of spraying, dipping, plating and spattering, a single layer or multi-layers of Ni base alloy, the chemical composition of which composes a certain melting point after reorganization following the first melting (after some atomic particles transferred), onto the cross section surface 1a and/or 2a, the tubes 1 and 2 are directly contacted each other.

After setting the tubes 1 and 2 and the insert material 4, discharge inert gas like Ar from the external and internal gas dischargers C1, C2 and C3, C3 are discharged to make shield on the external surface 5a and the internal surface 5b of the bonding boundary 5, and at the same time, the cooling water is made flow into the inductive coil of the heating device 5a, and simultaneously a high frequency is applied. Once inductive coil is charged high frequency electricity, as furnace effect, alteration electricity gathers at the surface of tube 1 and 2 and the heating is progressed from surface to the inside.

The temperature of the bonding boundary 5 is measured by the radiation thermometer B1. Data of temperature measured is transmitted to control panel (not shown here) through output terminal and works as feedback to control output of high frequency electric power source (not shown here) to follow a preset heat pattern.

When the temperature of the bonding boundary 5 reaches the preset bonding temperature which is not less than the melting point of the insert material 4 and less than the melting point of the tubes 1 and 2, then the temperature is held for a certain time (30 seconds for example) so as to sufficiently diffuse a part of elements included in the insert material 4 into the tubes 1 and 2. After sufficiently carrying out the diffusion of the element, the heating zone around the bonding boundary 5 is cooled down, then the bonding works are finished.

When bonding is demanded high degree of toughness or toughness combined with corrosion resistance in such an environment like oil field, the heat treatment is preferably carried out in the following manner. The heat zone which is heated above 300° C. during bonding is rapidly cooled down immediately after the bonding. Alternatively, after once cooling down, it is heated up again above the solution temperature and thereafter it is cooled down rapidly.

The dual stainless steel is rich in chrome and contains much high chromium ferrite phase, therefore, when cooled down gradually to the zone between 600 and 800° C., a sigma brittleness due to sigma phase precipitation of intermatelics is formed. Moreover, at gradual cooling between 370 and 530° C., a "475° C. brittleness" is formed due to producing dual phase segregation of high chromium alpha phase and low chromium ferrite alpha phase. These metallic conversion of phase may cause stiffness and brittleness at area close to the bonding boundary.

Furthermore, in case of gradual cooling between 450 and 850° C., a chromium rich $M_{23}C_6$ might be precipitated at the boundary of grain particle and could form Cr-evacuated zone at the boundary of grain particle which might cause sensitizing phenomena where those characteristics of grain boundary corrosion resistance or stress cracking corrosion resistance, is generated. The speed of diffusion of chromium in ferrite phase is so fast that Cr-evacuation is not generated so easily as the case of austenitic stainless steel. However, in order to keep the corrosion cracking resistance the of bonding so that it is the same as that of the mother metal, rapid cooling will be strongly necessary for the dual phase stainless steel bonding.

In case of rapid cooling, at stage of bonding or at stage of re-heating after air cooled, the temperature of the tube 1 and 2 is measured by the thermo-sensors E1 and E2, and the heating zone in each of tubes 1 and 2 heated above 300° C. is identified. After bonding or re-heating, the dual composed tube 6 is moved upward/downward based on the positioning signal concerning to the heating zone to decide the positions of the cooling nozzles D1 and D2. Then, the coolant such as water is discharged and sprayed to the heating zone.

The rapid cooling speed should be recommended as faster than rate of 5° C./sec and preferably as 10 to 30° C./sec. In case of slower than 5° C./sec, sigma phase brittleness, a "475° C. brittleness" and sensitizing above mentioned could not be prevented well.

At rapid cooling, the clamps A1 and A2 are kept in operation to apply a certain pressure in the axial direction of the tube to the bonding boundary. At the beginning of rapid cooling, because only the surface of the tube limitedly is cooled, a tensile stress on the surface of tubes 1 and 2 is generated to made stress cracking at the bonded cross sections. However, by applying the pressure at the rapid cooling, the pressing force cancels out the force of making tensile stress cracking on the surface. It is preferable that the pressing force applied during the rapid cooling is in the range of 5 to 10 MPa.

EXAMPLE 1

We did actual application of the bonding dual phase stainless steel by using the machine in FIG. 1.

The tube used in this example 1 has the following dimensions. The diameter of the tube was 115 mm, the wall thickness was 10 mm. Its material was SUS 329 J1 (JIS4303), a dual phase stainless steel the melting point of which is 1430° C. The roughness of the cross section surface for bonding was finished so that Rmax is not more than 15 μm. The insert material used in this example is a foil made of Ni—Si—B alloy (JIS Z3265; BNi-3) having the thickness of 30 μm and melting point 1050° C.

After the insert material described above was put between the bonding cross sections of the dual phase stainless steel tubes, the clamps A1 and A2 were moved to press the insert material by two side tubes, and the pressing force of 3 MPa was applied. The bonding boundary area was gas-shielded by Ar gas. 200 kW high frequency induction electric generator was used so as to apply the high frequent wave of 3 KHz to the induction heat coil. Then, liquid phase diffusion bonding was carried out at bonding temperature 1290° C. with 30 seconds of holding the temperature.

EXAMPLE 2

Fish scale shape insert material composed of Ni—Cr—Si—B alloy (JIS Z3265; BNi-5) having the thickness of 60 μm and the melting point of 1150° C., was put onto the cross section surfaces of tubes 1 and 2. The high frequent wave of 4 kHz was generated to heat up the bonding boundary to 1300° C. and kept the temperature for 180 seconds. All other conditions were as same as Example 1.

EXAMPLE 3

Fish scale shape insert material composed of Ni—Cr—Si—Fe—B alloy (JIS Z3265; BNi-2) having the thickness of 40 μm and the melting point of 1040° C., was put onto the cross section surfaces of tubes 1 and 2.

The high frequent wave of 5 kHz was generated to heat up the bonding boundary to 1295° C. and kept the temperature. All other conditions were as same as of Example 1.

Figure 2:
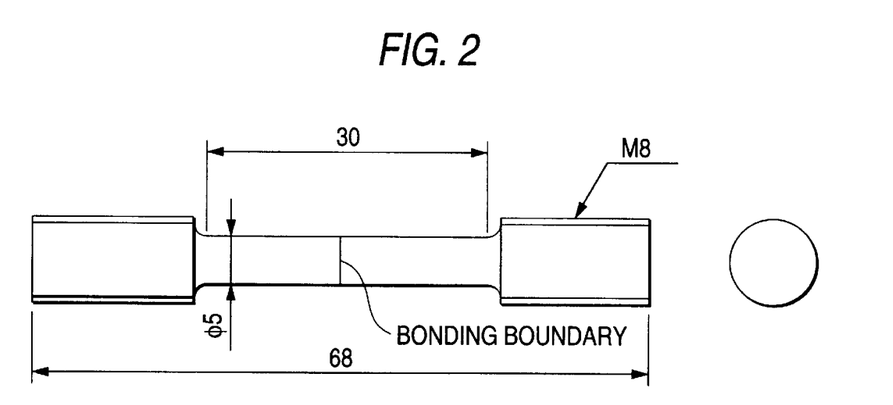
FIG. 2 shows a shape of a tensile strength specimen cut from the bonded joint which is produced by the bonding device as shown in FIG. 1.

In all three application tests, a tensile strength specimen of 5 mm diameter and 68 mm length which bonded boundary in the middle as was shown in FIG. 2, was cut off and tested tensile strength at cross head speed 1 mm/min. The test results were reported as shown in Table 1.

TABLE 1

|  | Example 1 | Example 2 | Example 3 |
|---|---|---|---|
| Bonding Condition |  |  |  |
| Insert Material |  |  |  |
| Type | thin foil | fish scale | powder |
| Composition | Ni—Si—B (BNi-3) | Ni—Cr—Si—B (BNi-5) | Ni—Cr—Si—Fe—B (BNi-2) |
| Melting point (° C.) | 1050 | 1150 | 1040 |
| Thickness | 30 | 60 | 40 |

TABLE 1-continued

|  | Example 1 | Example 2 | Example 3 |
|---|---|---|---|
| (μm) |  |  |  |
| Frequency (kHz) | 3 | 4 | 5 |
| Bonding Temperature (° C.) | 1290 | 1300 | 1295 |
| Holding Time (sec) | 30 | 180 | 60 |
| Pressing Force (MPa) | 3 | 3 | 4 |
| Shielding Gas |  |  |  |
| Out Side | Ar | Ar | He |
| In Side | Ar | Ar | He |
| Tensile Test |  |  |  |
| Tensile Strength (MPa) | 820 | 816 | 823 |
| Position of Rupture | Mother Material | Mother Material | Mother Material |
| Evaluation | ○ | ○ | ○ |

As results of three tests specimen tests, at the bonded boundary, each of three had no cracks and no deformation was identified, and was qualified as acceptable. Tensile strength of each sample of Examples 1, 2 and 3 were 820, 816 and 823 MPa respectively. None of three was broken at bonded boundary but broken at mother material.

COMPARATIVE EXAMPLE 1

The insert material used in this comparative example 1 is a foil having 30 μm thickness and 1190° C. melting point, and is composed of Fe—Si—B alloy as Si 4.6 wt %, B 2.8 wt % with residual of Fe. The diffusion bonding of the dual phase stainless steel was carried out with conditions that pressing load of 4 MPa, keeping the temperature for 120 seconds and other conditions being as same as of Example 1.

COMPARATIVE EXAMPLE 2

The insert material used in this comparative example 2 is powder having 50 μm thickness and 1150° C. melting point, and is composed of Ni—Cr—Si—B alloy (JIS Z3265; BNi-5). The diffusion bonding of the dual phase stainless steel was carried out with conditions that pressing load of 4 MPa, bonding temperature 1280° C., keeping the temperature for 120 seconds, shield gas helium and the other conditions being as same as of Example 1.

COMPARATIVE EXAMPLE 3

The insert material used in this comparative example 3 is a thin foil having 30 μm thickness of thin foil and 1150° C. melting point, composed chemistry of Ni—Cr—Si—B alloy (JISZ3265; BNi-5). The diffusion bonding of the dual phase stainless steel was carried out with conditions that pressing load of 4 MPa, bonding temperature 1300° C., keeping the temperature for 20 seconds, and the other conditions being as same as of Example 1.

COMPARATIVE EXAMPLE 4

The insert material used in this comparative example 4 is a foil having 30 μm thickness and 1150° C. melting point, and is composed of Ni—Cr—Si—B alloy (JIS Z3265; BNi-5). The diffusion bonding of the dual phase stainless steel was carried out with conditions that pressing load of 4

MPa, bonding temperature 1300° C., keeping the temperature for 210 seconds, and the other conditions being as same as of Example 1.

COMPARATIVE EXAMPLE 5

The insert material used in this comparative example 5 is a foil having 30 μm thickness and 1150° C. melting point, and is composed of Ni—Cr—Si—B alloy (JIS Z3265; BNi-5). The diffusion bonding of the dual phase stainless steel was carried out with conditions that pressing load of 2 MPa, bonding temperature 1300° C., keeping the temperature for 120 seconds, and the other conditions being as same as of Example 1.

COMPARATIVE EXAMPLE 6

The insert material used in this comparative example 6 is a foil having 30 μm thickness and 1150° C. melting point, and is composed of Ni—Cr—Si—B alloy (JIS Z3265; BNi-5). The diffusion bonding of the dual phase stainless steel was carried out with conditions that pressing load of 6 MPa, bonding temperature 1300° C., keeping the temperature for 120 seconds, and the other conditions being as same as of Example 1.

As results of the comparative examples 1 through 6, a testing specimen was cut off for tensile strength test in the same manner as of Example 1 through 3. The result was in table 2.

In Comparative Example 2 where bonding temperature was 1280° C., there observed no cracks and no deformation either, but tensile strength was 673 MPa and specimen was broken at the bonded boundary. Observation of the broken cross section of specimen showed unmelted part of the insert material.

In Comparative Example 3 where keeping temperature time was 20 seconds and in Comparative Example 4 ditto 210 seconds, the tensile strength was 638 MPa and 716 MPa respectively. Both of tensile strength specimen were broken at the bonded boundary.

Observation of the structure of the insert material of Comparative Example 3 was carried out by EPMA which showed at structure after bonded was almost same as that of before bonding, which means almost no diffusion of atomic particles was taken place. In case of Comparative Example 4, because of too long keeping time, a portion of the tube near the bonded boundary was deformed like a barrel and cracks at the bonded boundary were observed.

In the Comparative Example 5 where the bonding pressure was 2 MPa and in the Comparative Example 6 where the bonding pressure was 6 MPa, result of the tensile strength of each was 563 MPa and 771 MPa respectively. Both of specimens were broken at the bonded boundary. Observation of the broken cross section of specimen of the comparative example 5 showed existence of unbonded part, assumedly because of too snail bonding pressure. In Comparative Example 6, observation showed that a part of the tube near bonded boundary was deformed in large in shape of barrel and cracks at the bonded boundary were observed, assumedly because of too much bonding pressure loaded.

From result of the above several comparison tests, as for the insert material, Ni-base material was better than Fe-base

TABLE 2

|  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- |
| Bonding Condition | | | | | | |
| Insert Material | | | | | | |
| Type | thin foil | powder | thin foil | thin foil | thin foil | powder |
| Composition | Fe—Si—B | Ni—Cr—Si—B (BNi-5) | Ni—Cr—Si—B (BNi-2) | Ni—Cr—Si—B (BNi-5) | Ni—Cr—Si—B (BNi-5) | Ni—Cr—Si—B (BNi-5) |
| Melting point (° C.) | 1190 | 1150 | 1150 | 1150 | 1150 | 1150 |
| Thickness (μm) | 30 | 50 | 30 | 30 | 30 | 30 |
| Frequency (kHz) | 3 | 3 | 3 | 3 | 3 | 3 |
| Bonding Temperature (° C.) | 1290 | 1280 | 1300 | 1300 | 1300 | 1300 |
| Holding Time (sec) | 120 | 120 | 20 | 210 | 120 | 120 |
| Pressing Force (MPa) | 4 | 4 | 4 | 4 | 2 | 6 |
| Shielding Gas | | | | | | |
| Out Side | Ar | He | Ar | Ar | Ar | Ar |
| In Side | Ar | He | Ar | Ar | Ar | Ar |
| Tensile Test | | | | | | |
| Tensile Strength (MPa) | 580 | 673 | 638 | 716 | 563 | 771 |
| Position of Rupture | Interface | Interface | Interface | Interface | Interface | Interface |
| Evaluation | X | X | X | X | X | Δ |

In Comparative Example 1 where Fe base alloy instead of Ni base alloy was picked up for the insert material, there observed no cranks and no deformation, but tensile strength has decreased to 580 MPa and specimen was broken at the bonded boundary.

in bounding toughness, and as for the bonding temperature, time of keeping bonding temperature and bonding pressure, it was recognized that there could be some optimum criteria where deformation of the bonded material to be well controlled, ideal diffusion to be carried out and no unbonded part to be produced.

EXAMPLE 4

Actual dual phase stainless steel bonding was taken place by using the bonding device in FIG. 1.

The dual phase stainless steel used in this Example is SUS 329 JI (JIS 4303) having the diameter of 115 mn, the wall thickness of 10 mm and the melting point of 1430° C. The surface roughness of the cross section of the bonding tubes is: Rmax≦15 μm. The insert material is composed of Ni—Cr—Si—B alloy (JIS Z3265; BNi-5) having the melting point of 1150° C. and the thickness of 20 μm.

The insert material above described was put on the cross section surfaces of the dual phase stainless steel tubes, the clamps A1 and A2 clamped to hold the insert material between two tubes and 3 MPa of pressure force was applied.

Then both bonding boundary and area closed to there was applied 3 kHz of high frequency as well as being shielded by N₂ gas, and was heated up to 1350° C. and the temperature was kept for 60 seconds. Under this condition, the liquid phase diffusion bonding of the dual phase stainless steel was carried out.

EXAMPLE 5

Example 5 was carried but in the same condition as Example 4 except that the thickness of the insert material is 100 μm thin foil, the bonding pressure is 4 MPa and the shield gas is Ar.

COMPARATIVE EXAMPLE 7

Comparative Example 7 was carried out in the same condition as the above except that the thickness of insert material is 10 μm of metal powder, the insert material is composed of Ni—Cr—Si—B alloy (JIS Z3265; BNi-5), the bonding pressure is 4 MPa, the shield gas is Ar, and the keeping temperature time is 120 seconds.

COMPARATIVE EXAMPLE 8

Comparative Example 8 was carried out in the same condition as the above except that the thickness of insert material is 150 μm of a foil, the bonding pressure is 4 MPa, shield gas is Ar, and the keeping temperature time is 120 seconds.

From bonded joints obtained in Examples 4 and 5, and Comparative Examples 7 and 8, following the same process as of Example 1 through 3, the tensile strength test specimen were cut off and were tested.

The results were shown in Table 3.

TABLE 3

| | Example 4 | Example 5 | Comp. Ex. 7 | Comp. Ex. 8 |
|---|---|---|---|---|
| Bonding Condition | | | | |
| Insert Material | | | | |
| Type | thin foil | thin foil | powder | thin foil |
| Composition | Ni—Cr—Si—B (BNi-5) | Ni—Cr—Si—B (BNi-5) | Ni—Cr—Si—B (BNi-5) | Ni—Cr—Si—B (BNi-5) |
| Melting point (° C.) | 1150 | 1150 | 1150 | 1150 |
| Thickness (μm) | 20 | 100 | 10 | 150 |
| Frequency (kHz) | 3 | 3 | 3 | 3 |
| Bonding Temperature (° C.) | 1350 | 1350 | 1350 | 1350 |
| Holding Time (sec) | 60 | 60 | 120 | 120 |
| Pressing Force (MPa) | 3 | 4 | 4 | 4 |
| Shielding Gas | | | | |
| Out Side | N₂ | Ar | Ar | Ar |
| In Side | N₂ | Ar | Ar | Ar |
| Tensile Test | | | | |
| Tensile Strength (MPa) | 819 | 817 | 689 | 625 |
| Position of Rupture | Base Metal | Base Metal | Interface | Interface |
| Evaluation | ○ | ○ | x | x |

If the insert material were 20 μm and 100 μm in Examples 4 and 5 respectively, there observed no clacks and no deformation, and were qualified as acceptable. The tensile strength of bonded joints were 819 MPa and 817 MPa respectively and were broken at the mother material. On the other hand in Comparative Example 7, where the thickness of the insert material was 10 μm and 150 μm each, the tensile strength was 689 MPa and 625 MPa each, both of which were broken at the bonded boundary.

Observation of the broken cross section in Comparative Example 7 showed some unbonded parts assumedly caused by insufficient diffusion of metal powder.

Observation of the structure of the insert material by EPMA in Comparative Example 8 showed almost no transformation in at center part of the structure and was as same condition as before bonding. Diffusion was identified as insufficient.

From the above observation of the results, in order to avoid unbonded parts, to make sufficient diffusion and to produce strong enough bonded joints, the thickness of the insert material was identified to be controlled within some certain limit.

EXAMPLE 6

The diffusion bonding of the dual phase stainless steel tube was carried out by using the bounding device as shown in FIG. 1, under the following conditions. The bonding tube has the diameter of 180 mm and the thickness of 15 mm, is composed of dual phase stainless tube SUS 329J1 (JIS 4303). The insert material is composed of 2 wt % Si, 4 wt % Cr, 1 wt % Fe, 1 wt % B, Residual Ni, has the melting point of 1250° C. and the thickness of 40 µm.

The insert material above described was put on the cross section surfaces of the dual phase stainless steel tubes, the clamp A1 and A2 moved to hold insert material between two tubes and 4 MPa of pressure force was applied. Then both bonding boundary and area closed to there were applied 3 kHz of high frequency as well as being shielded by Ar gas, and was heated up to 1300° C. and the temperature was kept for 60 seconds. This was the process of diffusion bonding of dual stainless steel tube by the above condition.

EXAMPLE 7

Example 7 was carried out in the same condition as Example 6 except that; the insert material is a thin foil composed of 3 wt % Si, 5 wt % Cr, 2 wt % Fe, 2 wt % B, Residual Ni having the melting point of insert material of 1210° C. and the thickness of 40 µm, the bonding temperature is 1290° C. and time of keeping bonding temperature is 120 seconds.

EXAMPLE 8

Example 8 was carried out in the same condition as Example 6 except that the insert material is a thin foil composed of 6 wt % Si, 10 wt % Cr, 5 wt % Fe, 4 wt % B, Residual Ni having the melting point of 1030° C. and the thickness of 40 µm, the bonding temperature is 1350° C. and time of keeping bonding temperature is 120 seconds.

EXAMPLE 9

Example 9 was carried out in the same condition as Example 6 except that the insert material is a thin foil composed of 7 wt % Si, 15 wt % Cr, 6 wt % Fe, 4 wt % B, Residual Ni having the melting point of insert material of 1040° C. and the thickness of 40 µm, the bonding temperature is 1290° C., time of keeping bonding temperature is 120 seconds and the shield gas is He.

EXAMPLE 10

Example 10 was carried out in the same condition as Example 6 except that the insert material is a thin foil composed of 4 wt % Si, 3 wt % B, residual Ni having the melting point of insert material of 1050° C. and the thickness of 30 µm, the bonding temperature of 1290° C., time of keeping bonding temperature is 30 seconds and the bonding pressure is 3 MPa.

EXAMPLE 11

Example 11 was carried out in the same condition as Example 6 except that the insert material is a thin foil composed of 10 wt % Si, 18 wt % Cr, Residual Ni having the melting point of 1150° C. and the thickness of 20 µm, the bonding temperature is 1350° C., the bonding pressure is 3 MPa and the shield gas is $N_2$.

Figure 3:
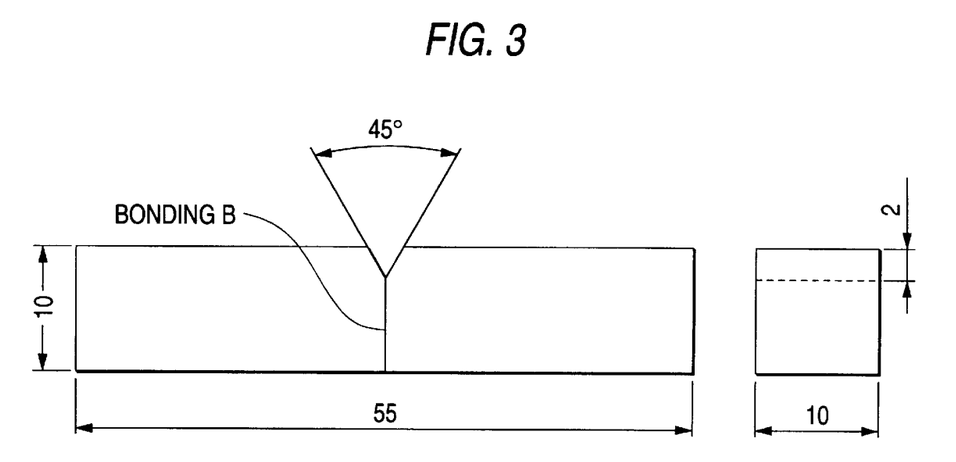
FIG. 3 shows a shape of a specimen cut from the bonded joint for Charpy impact test.

From the results obtained in Example 6 through 11, tensile strength test specimens were cut off in the same process of Example 1 through 3 to carry out the test. Impact value test specimens were also cut off bonded joints as shown in FIG. 3 as per JIS Z2202 No. 5 specimen to carry out Charpy notch toughness testing under the temperature of 0°. Results are shown in Table 4.

TABLE 4

| | Ex. 6 | Ex. 7 | Ex. 8 | Ex. 9 | Ex. 10 | Ex. 11 |
|---|---|---|---|---|---|---|
| Bonding Condition | | | | | | |
| Insert Material | | | | | | |
| Type | thin foil | thin foil | thin foil | thin foil | thin foil | thin foil |
| Composition | | | | | | |
| Si | 2 | 3 | 6 | 7 | 4 | 10 |
| Cr | 4 | 5 | 10 | 15 | 0 | 18 |
| Fe | 1 | 2 | 5 | 6 | 0 | 0 |
| B | 1 | 2 | 4 | 4 | 3 | 0 |
| Ni | Bal. | Bal. | Bal. | Bal. | Bal. | Bal. |
| Melting point (° C.) | 1250 | 1210 | 1030 | 1040 | 1050 | 1150 |
| Thickness (µm) | 40 | 40 | 40 | 40 | 30 | 20 |
| Frequency (kHz) | 3 | 3 | 3 | 3 | 3 | 3 |
| Bonding Temperature (° C.) | 1300 | 1290 | 1350 | 1290 | 1290 | 1350 |
| Holding Time (sec) | 60 | 120 | 120 | 120 | 30 | 60 |
| Pressing Force (MPa) | 4 | 4 | 4 | 4 | 3 | 3 |
| Shielding Gas | | | | | | |
| Out Side | Ar | Ar | Ar | He | Ar | $N_2$ |
| In Side | Ar | Ar | Ar | He | Ar | $N_2$ |
| Tensile Test | | | | | | |
| Tensile Strength (MPa) | 813 | 829 | 823 | 810 | 820 | 819 |
| Position of Rupture | Base Metal | Base Metal | Base Metal | Base Metal | Base Metal | Base Metal |
| Impact Test (vEo: J) | 32 | 72 | 69 | 38 | 25 | 22 |
| Evaluation | ◯ | Δ | Δ | ◯ | ◯ | ◯ |

The tensile strength tests of the specimens from Example 6 through 11 showed more than 800 MPa and were broken at the mother material. As for impact value test, bonded joints obtained from Example 7 and 8 showed as high as 73J and 69J respectively, but Example 6, 9, 10 and 11 showed as low as 32J, 38J, 25J and 22J respectively.

From the observation of the microstructure of the area near bonded boundary, those bonded joints obtained from Example 7 and 8 showed wave or crossing each other shape at the boundary of ferrite phase of the dual phase stainless steel and the insert material. On the other hands, those bonded joints obtained from Example 6, 9, 10, and 11 showed just flat or straight line boundary between the two materials.

From the above results, the insert material should be properly designed Ni base chemical component for controlling microscopic shape at the boundary between the ferrite phase of the dual phase stainless steel and the insert material, which improves the quality of bonding including impact value as well as the tensile strength.

EXAMPLE 12

A diffusion bonding of the dual phase stainless steel tube was carried out by using bonding device shown in FIG. 1 in the following conditions. The tube has the diameter of 180 mm and the thickness of 15 mm, and is composed of the dual phase stainless steel tube SUS 329JI (JIS 4303) having the melting point of tube of 1410° C. and the surface roughness of bonding cross section is Rmax=50 μm. The insert material is composed of Ni—Cr—Si—B alloy (JIS Z3265; BNi-5) having the melting point of 1150° C. and the thickness of 40 μm.

The insert material is put onto the cross section surfaces of the dual phase stainless steel tubes, the clamps A1 and A2 move to hold the insert material by the two tubes and the pressing force of 4 MPa was applied to the bonding boundary. Then, the boundary and near the boundary were applied 3 kHz of high frequency to heat up the bonding temperature to 1300° C. and to keep the temperature for 180 seconds. The dual phase stainless steel bonding was carried out in this conditions.

EXAMPLE 13

Example 13 was carried out in the same manner as Example 12 except that the surface roughness of the bonding cross section is Rmax=30 μm and time of keeping bonding temperature is 120 seconds.

COMPARATIVE EXAMPLE 9

Comparative Example 9 was carried out in the same manner as Example 12 except that the surface roughness of the bonding cross section is Rmax=120 μm and time of keeping bonding temperature is 60 seconds.

Specimens of tensile strength were cut off bonded joints of Example 12 and 13, and Comparative Example 9 in the same process illustrated in Example 1 through 3. The results of tensile strength test were shown in table 5.

TABLE 5

|  | Example 12 | Example 13 | Comp. Ex. 9 |
| --- | --- | --- | --- |
| Bonding Condition |  |  |  |
| Insert Material |  |  |  |
| Type | thin foil | thin foil | thin foil |
| Composition | Ni—Cr—Si—B (BNi-5) | Ni—Cr—Si—B (BNi-5) | Ni—Cr—Si—B (BNi-5) |
| Melting point (° C.) | 1150 | 1150 | 1150 |
| Thickness (μm) | 40 | 40 | 40 |
| Roughness of surface (Rmax: μm) | 50 | 30 | 120 |
| Frequency (kHz) | 3 | 3 | 3 |
| Bonding Temperature (° C.) | 1300 | 1300 | 1300 |
| Holding Time (sec) | 180 | 120 | 60 |
| Pressing Force (MPa) | 4 | 4 | 4 |
| Shielding Gas |  |  |  |

TABLE 5-continued

|  | Example 12 | Example 13 | Comp. Ex. 9 |
| --- | --- | --- | --- |
| Out Side | Ar | Ar | Ar |
| In Side | Ar | Ar | Ar |
| Tensile Test |  |  |  |
| Tensile Strength (MPa) | 822 | 823 | 559 |
| Position of Rupture | Base Metal | Base Metal | Interface |
| Evaluation | ○ | ○ | x |

In Example 12 and 13 where the surface roughness of bonding cross section was Rmax 50 μm and 30 μm respectively, an ideal bonding was obtained without any cracks and deformation. The tensile strength were 822 MPa and 823 MPa respectively and were broken at the mother material. On the other hand, in Comparative Example 9 in which the surface roughness of the bonding cross section was Rmax≦120 μm, although there did not happen cracking or deforming in the mother material, the tensile strength value was as low as 559 MPa. Specimen was broken at the bonded boundary.

In Comparative Example 9, the broken cross section of bonded joint showed partially unbonded area at the broken surface. Accordingly, it is necessary to control Rmax under certain value to make cross sections full contact and to produce qualified bonding.

EXAMPLE 14

A diffusion bonding of the dual stainless steel tube was carried out by using bonding device shown in FIG. 1 in the following conditions. The tube has the diameter of 180 mm and the thickness of 15 mm and is composed of the dual phase stainless steel SUS 329JI (JIS 4303) having the melting point of 1440° C. and the surface roughness of the bonding cross section of Rmax≦15 μm. The insert material is powder composed of Ni—Cr—Si—B alloy (JIS Z3265; Bni-5) having melting point of 1150° C.

This Ni-base metal powder put onto the cross section surface of the dual phase stainless steel tube as thick as 40 μm, the clamps A1 and A2 move to hold the insert material by the two tubes and the pressing force of 4 MPa was applied to the bonding boundary. Then, the boundary and near the boundary was applied 3 kHz of the high frequency to heat up the bonding temperature to 1300° C. and to keep the temperature for 180 seconds. The dual phase stainless steel bonding was carried out in this conditions.

COMPARATIVE EXAMPLE 10

Comparative Example 10 was carried out in the same manner as Example 14 except that the insertion material is a thin foil having the thickness of 40 μm, the frequency of the inductive electricity is 3 kHz, time of keeping bonding temperature is 120 seconds, and the gas shield was not carried out.

COMPARATIVE EXAMPLE 11

Comparative Example 11 was carried out in the same manner as Example 14 except that the insert material is a foil having the thickness of 40 μm, the frequency of inductive electricity is 200 kHz, and time of keeping bonding temperature is 60 seconds.

Specimens of tensile strength were cut off bonded joints of Example 14 and Comparative Examples 10 and 11 in the same process illustrated in Example 1 through 3. The results of the tensile were shown in Table 6.

TABLE 6

|  | Example 14 | Comp. Ex. 10 | Comp. Ex. 11 |
|---|---|---|---|
| Bonding Condition |  |  |  |
| Insert Material |  |  |  |
| Type | powder | thin foil | thin foil |
| Composition | Ni—Cr—Si—B (BNi-5) | Ni—Cr—Si—B (BNi-5) | Ni—Cr—Si—B (BNi-5) |
| Melting point (° C.) | 1150 | 1150 | 1150 |
| Thickness ($\mu$m) | 40 | 40 | 40 |
| Frequency (kHz) | 100 | 3 | 200 |
| Bonding Temperature (° C.) | 1300 | 1300 | 1300 |
| Holding Time (sec) | 180 | 120 | 60 |
| Pressing Force (MPa) | 4 | 4 | 4 |
| Shielding Gas |  |  |  |
| Out Side | Ar | Non | Ar |
| In Side | Ar | Non | Ar |
| Tensile Test |  |  |  |
| Tensile Strength (MPa) | 819 | 577 | 597 |
| Position of Rupture | Base Metal | Interface | Interface |
| Evaluation | ○ | x | x |

In Example 14 where the frequency of the high frequency applied to the induction coil was 100 kHz and Ar gas shielding was carried out, quality bonding with no cracking and no deformation was observed. The tensile strength was 819 MPa and was broken at the mother material. On the other hand, in Comparative Example 10 in which the gas shielding was not carried out, the tensile strength was 577 MPa and was broken at the bonded boundary. Observation of broken cross section showed oxides on the cross section surface.

In Comparative Example 11 where the frequency was 200 kHz and Ar gas shielding was carried out, the tensile strength was 597 MPa and was broken at the bonded boundary. Observation of broken cross section showed residual of the insert material on the external surface and the insert material unbelted on the internal surface side.

From the results above, it was recognized that the inert gas shield is an desirable condition to keep bonding cross section clean and providing bonding with quality. High frequency induction heating also demands a certain proper frequency, too much high frequency was a reason of failure of uniform heating.

In view of the above testings, it is possible to obtain the bonding body having the same strength as the mother material in accordance with the following factors. The optimum factors of making high quality bonding of the dual phase stainless steel is to select Ni-base insert material. Relatively high temperature, low pressure and short time bonding in comparison with the conventional one well controlled thickness of the insert material. Further, it is necessary to control the roughness of the cross section surface, to keep off air by gas shielding and to optimize the bonding condition such as the bonding atmosphere. The Nickel based alloy used as the insert material which is in the specific composition range should be used to extremely improve the impact value of the bonding body.

Further, as described above, it has been recognized that, even if the bonding method as described above according to the present invention is applied to the dual phase stainless tube having a practical size, there are no possibility to excessively deform the bonding portion and to generate crack on the surface of the bonding portion and a good bonding coupling for practical use can be obtained.

The present invention is not limited by the above Examples. Further, applied invention could be deduced from those experimental results. For example, those bonding of tube vs flange, dual structure tube bonding, plate vs plate, lap joint, T joints and any other shape material bonding could be practical by the present invention.

In this dual phase stainless steel bonding in the above Examples, SUS 329JI was intensively used, but other dual phase stainless steel including SUS 329 J3L and SUS 329 J4L and modified with several chemical contents can be used in this invention. Furthermore, ferrite, austenitic, martensite or precipitate type stainless steel, Fe base, Ni—Fe base, Ni base or Co-base material also can be used in the present invention.

For cooling method in addition to normal air or water cooling, impulsive rapid cooling by powerful nozzle was identified good for keeping the grain boundary corrosion resistance and the stress corrosion resistance quality as those of mother materials. Shot blast after bonding was identified good for improvement of tensile strength and fatigue strength.

In the bonding dual phase stainless steel of the present invention, comparing with the conventional method, high temperature, low bonding pressure short time as well as thickness of the insert material, roughness of the bonding surface were optimized from practical production view point therefore, unbonded or deformation and the other inconvenience was minimized and a high quality standard bonding process was established.

Ni-base insert material in some chemical combination was identified as ideal to improve boundary structure of ferrite phase/insert material, therefore impact value of the bonding was enormously developed.

Further, even if the bonding method according to the present invention is applied to the dual phase stainless steel having a practical size, there is no possibility to excessively deform the bonding area and to generate cracks on the surface of the bonding portion as well as it is possible to obtain the bonding coupling having the tensile strength equal to or more than the mother material. Accordingly, if it is applied to an oil tubular, it is possible to improve the working efficiency of excavating an oil field and to reduce the cost for excavating it. Therefore, the present invention is extremely effective invention for industry.

What is claimed is:

1. A method of bonding ferritic and austenitic dual stainless steels, comprising the steps of:

putting an insert material comprising a Ni base alloy having a melting point below 1290° C. between the bonding cross section faces of two dual phase ferritic-austenitic stainless steels applying pressure force in the range of 3 MPa to 5 MPa to a bonding area; and heating the bonding area at a temperature in the range of 1290° C. to a melting point of the dual phase ferritic and austenitic stainless steel in which the temperature is kept in said range for a time of 30 seconds to 180 seconds.

2. The bonding method according to claim 1, wherein the Ni base alloy has a shape of thin foil, fish scale or powder, and the insert material is applied between the bonding cross section faces of said steels to a thickness of 20 µm to 100 µm.

3. The bonding method according to claim 1, wherein the Ni base alloy has a composition of 3 wt %≦Si≦6 wt %, 5 wt %≦Cr≦10 wt %, 2 wt %≦Fe≦6 wt %, 2 wt %≦B≦4 wt %, the balance being nickel.

4. The bonding method according to claim 1, wherein a surface roughness of the bonding cross section face of the steel is Rmax≦50 µm.

5. The bonding method according to claim 1, wherein the bonding of the steels is performed in an atmosphere of inert gas.

6. The bonding method according to claim 1, wherein the bonding of the steels is performed by a high frequency induction heating wherein said frequency is equal to or less than 100 kHz.

7. The bonding method according to claim 1, further comprising the step of rapidly cooling a heat zone which is heated above 300° C. during boding immediately after the heating step.

8. The bonding method according to claim 7, wherein the rapid cooling speed is equal to or faster than 5° C./sec.

9. The bonding method according to claim 8, the rapid cooling speed is in the range of 10 to 30° C./sec.

10. The bonding method according to claim 1, further comprising the steps of:

after once cooling down the bonding area, reheating the bonding area above the solution temperature; and then rapidly cooling down the bonding area.

11. The bonding method according to claim 10, wherein the rapid cooling speed is equal to or faster than 5° C./sec.

12. The bonding method according to claim 11, the rapid cooling speed is in the range of 10 to 30° C./sec.

* * * * *